United States Patent
Choi et al.

(10) Patent No.: US 10,596,909 B2
(45) Date of Patent: Mar. 24, 2020

(54) HYBRID ENERGY STORAGE

(71) Applicants: The Regents of the University of Michigan, Ann Arbor, MI (US); Clemson University Research Foundation, Clemson, SC (US)

(72) Inventors: Saemin Choi, Ann Arbor, MI (US); Jason Benjamin Siegel, Ann Arbor, MI (US); Seyed Yasha Parvini Oskoui, Clemson, SC (US); Ernesto G. Urdaneta, Ann Arbor, MI (US)

(73) Assignees: The Regents of the University of Michigan, Ann Arbor, MI (US); Clemson University Research Foundation, Clemson, SC (US); Inmatech, Inc., Ann Arbor, MI (US)

( * ) Notice: Subject to any disclaimer, the term of this patent is extended or adjusted under 35 U.S.C. 154(b) by 0 days.

(21) Appl. No.: 15/571,739

(22) PCT Filed: May 6, 2016

(86) PCT No.: PCT/US2016/031270
§ 371 (c)(1),
(2) Date: Nov. 3, 2017

(87) PCT Pub. No.: WO2016/209378
PCT Pub. Date: Dec. 29, 2016

(65) Prior Publication Data
US 2018/0154779 A1     Jun. 7, 2018

Related U.S. Application Data

(60) Provisional application No. 62/157,740, filed on May 6, 2015.

(51) Int. Cl.
*H02J 7/00* (2006.01)
*B60L 11/00* (2006.01)
(Continued)

(52) U.S. Cl.
CPC .............. *B60L 11/005* (2013.01); *B60L 1/00* (2013.01); *B60L 50/40* (2019.02); *B60L 58/20* (2019.02);
(Continued)

(58) Field of Classification Search
CPC .................................................. B60L 11/1824
(Continued)

(56) References Cited

U.S. PATENT DOCUMENTS 8,670,888 B1 * 3/2014 Brenner .............. B60L 11/126
701/22
2008/0218104 A1 9/2008 Lukic et al.
(Continued)

FOREIGN PATENT DOCUMENTS

WO     2015043696 A1     4/2015
WO     2015045050 A1     4/2015

OTHER PUBLICATIONS

Anthony M. Gee et al., "Analysis of Battery Lifetime Extension in a Small-Scale Wind-Energy System Using Supercapacitors", Transactions on Energy Conversion, Mar. 2013, 10 pages, vol. 28, No. 1.
(Continued)

*Primary Examiner* — Yalkew Fantu
(74) *Attorney, Agent, or Firm* — Lempia Summerfield Katz LLC

(57) ABSTRACT

A system includes a first energy storage device, a second energy storage device coupled to the first energy storage device and charged via a charging current from the first energy storage device, a power controller having a processor, a memory coupled to the processor and on which charging current instructions are stored, and a converter coupled to the processor and directed via switch control signals from the processor, and an output terminal via which power is provided to a load of the system. The converter is
(Continued)

disposed between the first energy storage device and the output terminal. The converter is disposed between the first and second energy storage devices and configured to control a level of the charging current in accordance with the switch control signals. The charging current instructions are executed by the processor to cause the processor to generate the switch control signals such that the level of the charging current is regulated.

20 Claims, 4 Drawing Sheets

(51) Int. Cl.
    *H02J 7/14*     (2006.01)
    *H02J 7/34*     (2006.01)
    *B60L 1/00*     (2006.01)
    *B60L 50/40*     (2019.01)
    *B60L 58/22*     (2019.01)
    *B60L 58/20*     (2019.01)

(52) U.S. Cl.
    CPC ............ *B60L 58/22* (2019.02); *H02J 7/1423* (2013.01); *H02J 7/345* (2013.01); *B60L 2240/547* (2013.01); *Y02T 10/7005* (2013.01); *Y02T 10/7022* (2013.01); *Y02T 10/7061* (2013.01); *Y02T 10/7066* (2013.01)

(58) Field of Classification Search
    USPC ....................................................... 320/104
    See application file for complete search history.

(56) References Cited

U.S. PATENT DOCUMENTS

| | | | | |
|---|---|---|---|---|
| 2008/0315829 A1* | 12/2008 | Jones | ...................... | H02J 7/345 320/103 |
| 2009/0212626 A1* | 8/2009 | Snyder | ................... | B60K 6/448 307/10.1 |
| 2011/0115288 A1* | 5/2011 | Lee | ........................ | B60K 6/485 307/10.1 |
| 2011/0234171 A1* | 9/2011 | An | .......................... | B62M 6/90 320/135 |
| 2016/0036248 A1* | 2/2016 | Hamada | ................ | H02J 7/0016 320/166 |

OTHER PUBLICATIONS

B. Frenzel et al., "Electromobility Concept for Racing Cars Based on Lithium-Ion Batteries and Supercapacitors", Journal of Power Sources, Oct. 27, 2010, pp. 5364-5376, vol. 196.

Haihua Zhou et al., "Composite Energy Storage System Involving Battery and Ultracapacitor with Dynamic Energy Management in Microgrid Applications", Transactions on Power Electronics, Mar. 2011, pp. 923-930, vol. 26, No. 3.

José M. Blanes et al., "Electric Vehicle Battery Life Extension Using Ultracapacitors and an FPGA Controlled Interleaved Buck-Boost Converter", Transactions on Power Electronics, Dec. 2013, 9 pages, vol. 28, No. 12.

M.E. Glavin et al., "Optimisation of a Photovoltaic Battery Ultracapacitor Hybrid Energy Storage System", Solar Energy, Aug. 8, 2012, pp. 3009-3020, vol. 86.

Simone Fiorenti et al., "Modeling and Experimental Validation of a Hybridized Energy Storage System for Automotive Applications", Journal of Power Sources, Apr. 22, 2013, pp. 112-120, vol. 241.

Yasha Parvini et al., "Optimal Charging of Ultracapacitors During Regenerative Braking", Electric Vehicle Conference (IEVC), Mar. 2012, 6 pages.

Yasha Parvini et al., "Preliminary Results on Identification of an Electro-Thermal Model for Low Temperature and High Power Operation of Cylindrical Double Layer Ultracapacitors", 2014 American Control Conference, Jun. 2014, pp. 242-247.

International Preliminary Report on Patentability in International Application No. PCT/US2016/031270, dated Nov. 16, 2017, 8 pages.

* cited by examiner

HYBRID ENERGY STORAGE

CROSS-REFERENCE TO RELATED APPLICATION

This U.S. national phase application is based on International Application No. PCT/US2016/031270, which claimed the benefit of U.S. provisional application entitled "Efficient Hybrid Energy Storage System," filed May 6, 2015, and assigned Ser. No. 62/157,740, the entire disclosures of which are hereby expressly incorporated by reference. Priority benefit of these earlier filed applications is hereby claimed.

STATEMENT REGARDING FEDERALLY SPONSORED RESEARCH OR DEVELOPMENT

This invention was made with government support under Contract No. W56HZV-04-2-0001 awarded by the U.S. Army/TACOM. The government has certain rights in the invention.

BACKGROUND OF THE DISCLOSURE

Field of the Disclosure

The disclosure relates generally to energy storage.

Brief Description of Related Technology

This brief description is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid and electric vehicles continue to gain prominence amongst consumers. These vehicles offer higher performance than in the past. The vehicles are able to sustain that performance over longer distances than their predecessors. Many of the vehicle improvements result from advances in battery technology, both in terms of energy storage and energy delivery. Yet, despite advances, vehicle range is still a challenge being addressed by the developers of such vehicles.

Of the numerous efforts to improve electrical vehicle performance, increasing the energy density of batteries is a prime area of research that has led to the development of various secondary types of batteries in electric and hybrid electric vehicles. Lead-acid, nickel metal hydride, and lithium-ion battery chemistries have all been examined for commercialization. The power requirements for electric and hybrid electric vehicles have made lithium-ion the dominant chemistry, mostly because lithium-ion is able to achieve higher power density.

Yet, even with advances in lithium-ion technology, numerous challenges still remain. There is still a desire to address accelerated aging of batteries, especially under high power application. For example, the amount of regenerative braking energy captured by batteries is limited because of limitations in charging rates to batteries. Another challenge involves the size of the battery pack to satisfy the increasing power requirements of electric and hybrid vehicles. Yet another challenge is the higher cost of lithium-ion batteries relative to other battery chemistries.

SUMMARY OF THE DISCLOSURE

In accordance with one aspect of the disclosure, a system includes a first energy storage device, a second energy storage device coupled to the first energy storage device and charged via a charging current from the first energy storage device, a power controller including a processor, a memory coupled to the processor and on which charging current instructions are stored, and a converter coupled to the processor and directed via switch control signals from the processor, and an output terminal via which power is provided to a load of the system. The converter is disposed between the first energy storage device and the output terminal. The converter is disposed between the first and second energy storage devices and configured to control a level of the charging current in accordance with the switch control signals. The charging current instructions are executed by the processor to cause the processor to generate the switch control signals such that the level of the charging current is regulated.

In another aspect, a system includes a battery, a supercapacitor coupled to the battery, charged via a charging current from the battery, and including a plurality of cells, a power controller including a processor, a memory coupled to the processor and on which charging current instructions are stored, and a converter coupled to the processor and directed via switch control signals from the processor, and an output terminal via which power is provided to a load of the system, the output terminal being electrically tied to a terminal of the supercapacitor. The converter is disposed between the battery and the supercapacitor and configured to control a level of the charging current in accordance with the switch control signals. The charging current instructions are executed by the processor to cause the processor to generate the switch control signals such that a voltage at the terminal of the supercapacitor is regulated and overcharge protection of each cell of the plurality of cells is provided.

In yet another aspect, a method of controlling an energy storage system includes obtaining data representative of a plurality of energy storage system parameters, the plurality of energy storage system parameters being indicative of operating conditions of a battery or of a supercapacitor, the operating conditions including a level of a charging current from the battery for charging the supercapacitor, implementing, with a processor, a control procedure to generate a set point for the charging current, the control procedure taking the obtained data representative of the plurality of energy storage system parameters as input data, and generating, with the processor, switch control signals for a converter of the energy storage system disposed between the battery and the supercapacitor to receive the charging current, the switch control signals being generated in accordance of the set point.

In connection with any one of the aforementioned aspects (including, for instance, those set forth above in the Summary of the Disclosure), the systems or methods may alternatively or additionally include any combination of one or more of the following aspects or features. A terminal of the second energy storage device is electrically tied to the output terminal. The charging current instructions are executed by the processor to cause the processor to generate the switch control signals such that a terminal voltage of the second energy storage device is regulated. The second energy storage device includes a plurality of supercapacitor cells. The charging current instructions are executed by the processor to cause the processor to implement cell balancing across the plurality of supercapacitor cells. Each supercapacitor cell of the plurality of supercapacitor cells is charged by a respective cell current. The charging current corresponds with a sum of the respective cell currents for the plurality of supercapacitor cells. The charging current instructions are executed by the processor to cause the processor to generate the switch control signals to regulate the respective cell currents to control a respective cell voltage of each supercapacitor cell of the plurality of supercapacitor cells relative to a threshold cell voltage. The charging current instructions are executed by the processor to cause the processor to regulate the charging current via a hysteretic control procedure directed to maintaining a terminal voltage of the second energy storage device within a voltage range. The charging current instructions are executed by the processor to cause the processor to regulate the charging current via a model predictive control procedure directed to establishing a current set point for the charging current. The model predictive control procedure is configured to determine the set point for the charging current based on a plurality of load profile parameters indicative of operation of the load. The plurality of load profile parameters include vehicle distance to next intersection. The model predictive control procedure is configured to determine the set point for the charging current based on a plurality of energy storage parameters indicative of operating conditions of the first and second energy storage devices. The model predictive control procedure is configured to determine the set point for the charging current based on an operating condition of the converter. The second energy storage device includes a vanadium nitride-based electrode. The converter is configured as a unidirectional DC/DC converter. The converter is configured to implement phase shift modulation. The system further includes a vehicle regenerative braking system coupled to the output terminal to store regenerative braking energy in the second energy storage device. The first and second energy storage devices have first and second power densities and first and second energy densities, respectively. The first energy density is higher than the second energy density. The second power density is higher than the first power density. Implementing the control procedure includes determining whether a respective energy storage system parameter of the plurality of energy storage system parameters exceeds a threshold. Generating the switch control signals includes discontinuing the charging current if the respective energy storage system parameter exceeds the threshold. The plurality of energy storage system parameters includes respective cell voltages for a plurality of cells of the supercapacitor, and the control procedure includes a hysteretic control procedure that constrains each respective cell voltage. Implementing the control procedure includes generating the set point based on the input data. The control procedure includes a model predictive control procedure configured to determine the set point. The method further includes obtaining load profile data indicative of operation of a load of the energy storage system. The model predictive control procedure takes the obtained load profile data as further input data. Implementing the control procedure includes accessing a memory in which model data for the model predictive control procedure is stored, and adjusting the model data based on the obtained data.

BRIEF DESCRIPTION OF THE DRAWING FIGURES

For a more complete understanding of the disclosure, reference is made to the following detailed description and accompanying drawing figures, in which like reference numerals may be used to identify like elements in the figures.

Figure 3:
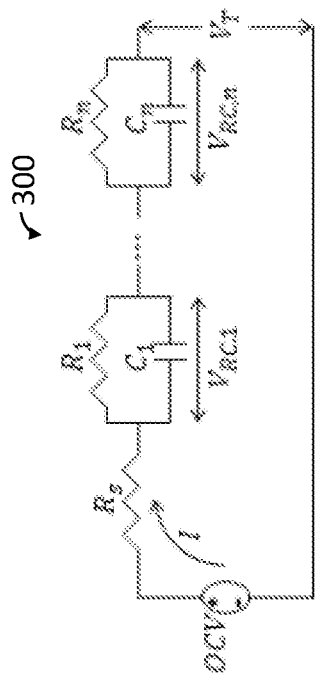
FIG. 3 is a schematic illustration of an equivalent circuit model of an energy storage device in accordance with one example.

The disclosed devices, systems, and methods may assume various forms. Specific examples are illustrated in the drawing (and are hereafter described) with the understanding that the disclosure is intended to be illustrative, and is not intended to limit the invention to the specific examples described and illustrated herein.

DETAILED DESCRIPTION OF THE DISCLOSURE

Energy storage systems having multiple energy storage devices are described, along with methods of controlling such systems. In some cases, different types of energy storage devices are used. For example, the energy storage systems include a supercapacitor (or ultracapacitor) in addition to a battery. The energy storage systems may be hybrid energy storage systems. For instance, the disclosed methods and systems support the hybridization of less-expensive battery chemistries, such as lead-acid, with other types of storage devices, such as supercapacitors.

The multiple energy storage devices may differ in energy density and power density. For instance, one energy storage device may have a high energy density but a low power density relative to another energy storage device having high power density but a low energy density. The high power density of one energy storage device is useful to satisfy the power demands of certain loads (e.g., a vehicle motor) and to accommodate recharging scenarios (e.g., regenerative braking). The high energy density of the other energy storage device is useful to support operation of the load over time (e.g., vehicle range).

The systems and methods may be configured for, or otherwise involve, unidirectional charging between the energy storage devices. For instance, the energy storage system may have a unidirectional power converter topology in which a power converter is configured to charge a supercapacitor or other energy storage device by current from a battery, but not vice versa. In some cases, the supercapacitor is then connected across a load, while the power converter is disposed between the battery and the load. Other sources of energy may be present. In some cases, the supercapacitor is also charged by a generator (e.g., a regenerative braking system).

The charging current provided by one of the energy storage devices may be regulated. In some cases, a power controller is configured to generate and/or otherwise apply a set point for the charging current. A constant or otherwise regulated charging current is useful in, for instance, minimizing or decreasing stress on the energy storage device. Some energy storage devices, such as batteries, would otherwise be undesirably stressed in applications involving high power loads. The regulation of the charging current is possible given a topology in which the device providing the charging current is not directly connected to the load.

A set point for the charging current is constant or varying. In the latter cases, the set point is updated in accordance with a control procedure or strategy. In some cases, the control procedure is a model predictive control procedure. A model for the control procedure may include, or be configured via, both internal parameters (e.g., indicative of the operation, condition, and/or other characteristics of the storage device and/or power controller) and external parameters associated with the operation and/or other characteristics of the load.

The charging current may be regulated in alternative or additional ways. In some cases, the charging current is regulated via a hysteretic control procedure. The hysteretic control procedure may be directed to maintaining a terminal voltage of, e.g., a supercapacitor, within a voltage range and/or respective cell voltages of the supercapacitor within a voltage range. In such cases, the charging current may be switched off when a terminal or other voltage or other operational parameter (e.g., converter operating temperature) falls outside of a desired range.

The control procedures directed to regulating the charging current and the supercapacitor terminal voltage may include or be implemented in connection with a control procedure directed to constraining the individual cell voltages. For instance, the control procedure may include or involve cell balancing. Each individual cell may thus be protected from reaching an overcharge condition. For example, in vehicular cases in which the supercapacitor is absorbing energy from regenerative braking, data indicative of the kinetic energy of the vehicle may be used to regulate the individual cell voltages so that a threshold is not exceeded during a regenerative braking event.

The regulation of the charging current and the energy storage topology may be combined to provide the benefits of the different types of energy storage devices. The regulation of the charging current effectively meters the demands placed upon the high energy density device (e.g., a battery). The peak load imposed on the battery may thus be limited or otherwise controlled. Any high power demands from the load are accommodated by the high power density device (e.g., a supercapacitor) connected across the load. The lifetime of the battery is thereby increased.

Although described below in connection with electric and hybrid electric vehicles, the disclosed methods, devices, and systems are useful in a wide variety of applications and usage scenarios. The methods may be implemented in a number of power/energy distribution applications. Example applications include renewable power generation using wind turbines or photovoltaic cells, distributed energy storage for local electric grid stabilization, and universal power supply (UPS)/backup power. The present techniques may be useful in connection with various applications involving both high energy and high power demands.

Figure 1:
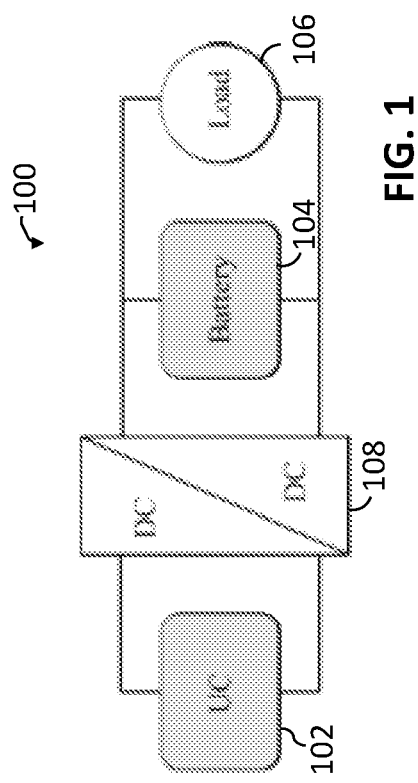
FIG. 1 is a schematic illustration of an active hybrid energy storage system with a direct connection between a battery and a load in accordance with one example.
Figure 2:
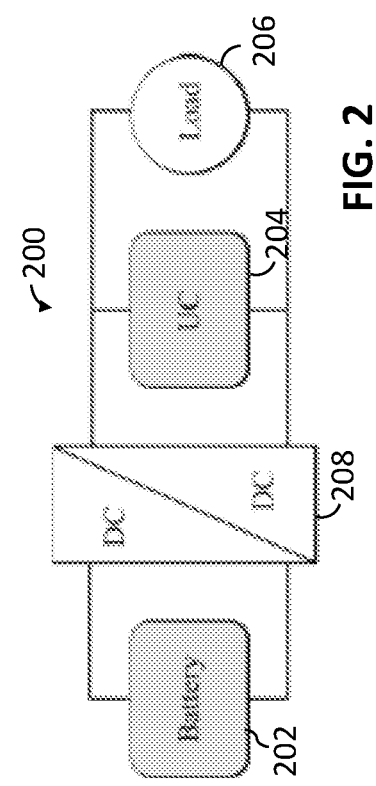
FIG. 2 is a schematic illustration of an active hybrid energy storage system with a direct connection between a supercapacitor and a load in accordance with one example.

FIGS. 1 and 2 depict examples of alternative power management topologies 100, 200 having multiple energy storage devices. In these examples, each topology includes two energy storage devices. In FIG. 1, the topology 100 includes energy storage devices 102, 104 in which energy is stored for powering a load 106. The energy storage device 102 is or includes a supercapacitor (or ultracapacitor) 102. The energy storage device 104 is or includes a battery 104. In FIG. 3, the topology 200 includes energy storage devices 202, 204 in which energy is stored for powering a load 206. In FIG. 2, the positions of the supercapacitor and the battery are reversed. The energy storage device 202 is or includes a battery 202. The energy storage device 204 is or includes a supercapacitor (or ultracapacitor) 204.

The supercapacitors 102, 204 are electrochemical energy-storage devices. The supercapacitors 102, 204 are well-suited for complementing batteries for load-leveling or uninterruptible power supply applications. In terms of specific energy and specific power, the supercapacitors 102, 204 fill the gap between conventional capacitors and batteries. The supercapacitors 102, 204 may be or include currently available supercapacitors, which may provide pulses of up to a few seconds. For certain topologies described herein, such as the topology 200 (FIG. 2), it may be useful for the supercapacitor 204 to efficiently manage longer pulses, which translates to higher energy densities. The topology 200 provides a way to provide such higher energy densities.

The supercapacitors 102, 204 have unusually high capacitances compared to traditional capacitors, due to their charge storage mechanisms. In addition to charge storage during formation of an electrical double layer, a portion of the capacitance may be from fast, reversible redox reactions taking place near the electrode surface. The supercapacitors 102, 204 provide higher power than the batteries 104, 202, while typically storing less energy. The supercapacitors 102, 204 may be or include commercial supercapacitors that use very high-surface-area carbon-based active materials. These materials typically yield specific capacitances of up to 200 F/g.

In some examples, the supercapacitors 102, 204 are asymmetric supercapacitors. These asymmetric supercapacitors may be formed of a first electrode including a first active material and having a first operating window. The first active material includes a metal nitride, a metal oxynitride, a metal carbide, a metal oxycarbide, a metal boride, a metal oxyboride, and/or combinations thereof. The metal is selected from the group consisting of Groups III, IV, V, VI, or VII of the Periodic Table. The asymmetric supercapacitor may further include a second electrode including a second active material and having a second operating window. The first and second operating windows may overlap by some amount. For example, the first and second operating windows may overlap by less than 60%, based on the voltage. The supercapacitor may also include a separator disposed between the first and second electrodes and an aqueous electrolyte. In some examples, the supercapacitor is formed of vanadium nitride (VN) as the first active material. More specifically, the supercapacitors herein may be, VN-based aqueous pseudocapacitors. Examples of suitable asymmetric supercapacitors are described in U.S. application Ser. No. 13/272,185, entitled "High Performance Transition Metal Carbide and Nitride and Boride Based Asymmetric Supercapacitors," the entire disclosure of which is hereby incorporated by reference.

Both of the topologies 100, 200 involve active power management. In each active topology, one or more converters may be used to accommodate the multiple energy storage devices and the loads. In these examples, only a single converter is disposed between the two energy storage devices. In FIG. 1, a converter 108 is disposed between the supercapacitor 102 and the load 106. In FIG. 2, a converter 208 is disposed between the battery 202 and the load 206.

The number of converters in the topology presents tradeoffs in, for instance, efficiency and control. A topology with two converters allows more (e.g., full) control of the power flow between the various energy storage devices (e.g., battery, supercapacitor) and the load. Using one converter is less expensive, easier to control, and results in smaller losses compared to two converters.

FIG. 1 illustrates a battery-to-load configuration. In this case, the battery 104 is connected across the load 106. In the example shown, the terminals of the battery 104 are electrically tied to the terminals of the load 106. In contrast, the supercapacitor 102 is not connected across the load 106. Instead, the supercapacitor 102 provides current to the converter 108.

FIG. 2 illustrates a supercapacitor-to-load configuration. In this case, the supercapacitor 204 is connected across the load 206. In the example shown, the terminals of the supercapacitor 204 are electrically tied to the terminals of the load 206. In contrast, the battery 202 is not connected across the load 206. Instead, the battery 202 provides current to the converter 208.

The energy storage systems 100, 200 of FIGS. 1 and 2 have two modes of operation: (i) a storage mode in which energy is stored in one or more of the energy storage elements; and (ii) a delivery mode in which energy is provided by one of the energy storage elements to the connected load. In some vehicle implementations of the configuration of FIG. 2, the storage mode may be associated with regenerative braking in which energy from vehicle braking is stored in the supercapacitor 204, but not in the battery 202. In that case, the battery 202 may (additionally or separately) charge the supercapacitor 204. Such charging may occur during operation in either the storage mode or the delivery mode. In some vehicle implementations, the delivery mode may include delivering energy from the supercapacitor 204 to the load 206 during traction operation of the vehicle.

In some cases (e.g., with lead-acid batteries used in the batteries 104, 202), the internal resistance of the supercapacitors 102, 204 is much less than that of the batteries 104, 202. As a result, connecting the supercapacitor 204 directly to the load 206 as in FIG. 2 increases the traction efficiency. Also, the supercapacitors 102, 204 can undergo high charging currents and are much more efficient during charging compared to the batteries 104, 202, which increases the regenerative braking efficiency.

The supercapacitor 204 works in conjunction with the battery 202 to provide energy (or power) to the load 206. In the example of FIG. 2, the supercapacitor 204 is configured to provide the primary power delivery function. For example, in a hybrid or electric vehicle implementation, the supercapacitor 204 supplies the power to the powertrain to meet traction requirements for the vehicle. The battery 202 remains isolated from the load 206 in such circumstances. The supercapacitor 204 is also positioned and otherwise configured to capture energy during a storage operation, such as from a regenerative braking operation in a vehicle application.

In the example of FIG. 2, the battery 202 is used to charge the supercapacitor 204. The charging current may be a constant current. As described herein, a constant charging current provides a more efficient way of discharging the battery 202 and of charging the supercapacitor 204. In such cases, the power demanded from the battery 202 may be much lower than if, for instance, the battery 202 were directly powering the load 206. The lower power demand allows usage of less expensive or higher energy density battery chemistries operating with lower power density demands. In some cases, the battery 204 operates in an almost-steady state condition, which improves battery life and also helps to overcome the shortcomings of the battery operation at low temperatures to provide high power.

A number of computationally-efficient and effective control procedures are described herein. The control procedures can lower or minimize the number of power converters within the energy supply system. For example, in some implementations, only one DC-to-DC converter is deployed between the energy storage devices of the system (e.g., a battery and a supercapacitor) in order to regulate the current drawn from one device (e.g., the battery) and to maintain the current draw at a desired level (e.g., a constant). In some configurations described herein, the power converter is unidirectional in the sense that energy (e.g., current) is flowing in only one direction between the energy storage devices (e.g., from the battery to the supercapacitor). Such converters are less expensive than bi-directional converters. A unidirectional power converter may be used because, for instance, the battery does not need to discharge the fully charged supercapacitor. Also, the supercapacitor has a much lower internal resistance compared to various battery chemistries. As a result, the efficiency during charging and discharging is improved on the load side.

One of the design realities of the topology 200 (FIG. 2) is that the terminal voltages at the supercapacitor 204 vary faster (e.g., much faster) than that of batteries (e.g., the battery 202). But a large voltage window is not favorable on the load side. Therefore, in some configurations, a second DC-to-DC converter between the load 206 and the supercapacitor 204 may be used to regulate the voltage to a DC voltage level (e.g., a bus voltage) suitable for the load 206.

In the examples described below, the voltage variation on the supercapacitor side is limited to an acceptably small range through the use of an appropriate power management strategy or procedure. The energy storage systems need not rely on a second converter. The power management procedures avoid the second DC/DC converter by controlling the current provided by the converter 208 (FIG. 2) (i.e., the supercapacitor charging rate). The converter current is maintained within a tighter operating window to maintain the supercapacitor voltage in a tighter voltage range.

In some cases, the power management procedure is based upon one or more models of the elements of the system, including, for instance, a model of the energy storage devices, a model of the converter, and a model of the load. For instance, the models of the energy storage devices and the load may be used to predict the demand on the devices, as well as the operation of the devices in response to such demand.

Figure 4:
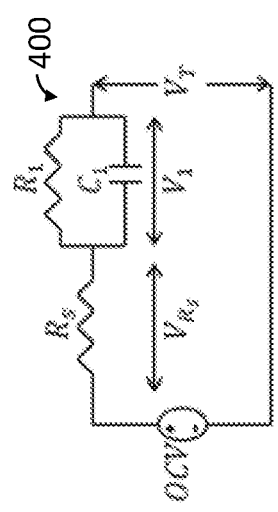
FIG. 4 is a schematic illustration of an equivalent circuit model of an energy storage device in accordance with another example.

FIGS. 3 and 4 are circuit diagrams for modeling energy storage devices in accordance with two examples. Each circuit diagram 300, 400 provides a respective framework for a device model. In some cases, the same model framework may be used to represent each of the energy storage devices in a system. The terminal voltage of a supercapacitor (e.g., the supercapacitor 204 of FIG. 2) and a battery (e.g., the battery 202 of FIG. 2) using an equivalent electric circuit. The equivalent circuit results in computationally efficient models of the energy storage devices for control-oriented procedures.

FIG. 3 shows the schematic of an equivalent electric circuit model 300 in accordance with one example. The circuit model 300 includes an equivalent series resistance $R_s$ that represents the internal resistance of the cells of the energy storage device. The circuit model 300 also includes a number of parallel resistor-capacitor (R-C) branches (or pairs), $R_1$-$C_1$ ... $R_n$-$C_n$, that capture the voltage behavior during relaxation. Considering positive current for charging and negative sign for discharging, the terminal voltage is governed by:

$$V_t = V_{ocv}(SOC) + IRs + \sum_{j=1}^{n} V_{RC,j} \quad (1)$$

In Equation (1), $V_{ocv}$ is the open circuit voltage (OCV). The state of charge (SOC) of the energy storage device is determined by coulomb counting in accordance with the following state equation:

$$\frac{dSOC}{dt} = \frac{I}{C_{nom}} \quad (2)$$

where $C_{nom}$ is the nominal capacity of the energy storage device. The second term in Equation (1) is the voltage drop over the ohmic resistance. The third and last term is the sum of the voltage drops across the parallel R-C branches connected in series (e.g., in series with the resistance $R_s$). The voltage dynamics of each R-C pair is described as:

$$\frac{dV_{RC,j}}{dt} = -\frac{1}{R_j C_j} V_{RC,j} + \frac{I}{C_j} \quad (3)$$

where $R_j$ and $C_j$ are the equivalent resistance and capacitance, respectively.

In one example implementation of the topology 200 of FIG. 2, the battery 202 is modeled as a lead-acid battery having the specifications set forth below in Table I. The specifications may correspond with a AP-12220EV lead acid module available from Amstron Corporation of Valencia, Calif. The battery capacity was measured by discharging the battery from upper voltage limit to its lower voltage limit under small current rate of C/40. The actual capacity measured for the module was 19.7 Ah at 100% depth of discharge. The module similar to most lead acid batteries operates at a 35% depth of discharge (DOD). In order to evaluate the OCV as a function of SOC, a fully charged battery is discharged at a low current of C/40 for 2 hours, which is equivalent to a 5% change in SOC, followed by a 3 hours relaxation period. This 5% pulse-relaxation is then repeated until a 65% state of charge is reached.

The voltage after each relaxation period is the OCV at the corresponding SOC. From that data, a look-up table is generated for the battery model as the OCV profile. In some cases, the battery model is a first order model. FIG. 4 depicts a first order model 400 in accordance with one example, in which a single R-C branch is connected in series to the series resistance $R_s$. The parameters of the model 400 to be identified are thus the series resistance $R_s$, the resistance $R_1$, and the capacitance $C_1$. The parameter identification can be achieved by, for instance, minimizing the square error between the measured and simulated terminal voltages at each time instant. In one example, a cost function was used:

$$J = \sum_{k} (V_m(k) - V_s(k))^2 \quad (4)$$

where $V_m$ and $V_s$ are the measured and simulated terminal voltages, respectively.

TABLE I

| LEAD ACID BATTERY SPECIFICATION | |
| --- | --- |
| Voltage (V) | 12 |
| Upper Voltage Limit (V) | 14.7 |
| Lower Voltage Limit (V) | 10.5 (at C/20) |
| Nominal Capacity (Ah) | 22 |
| Specific Power (W/Kg) | 180 |
| Specific Energy (Wh/Kg) | 42 |

Another circuit model is generated for the supercapacitor 204 of the topology 200 of FIG. 2. In one example, the circuit model is based on a supercapacitor commercially available from Maxwell, the BCAP3000 cylindrical cell, with activated carbon as electrodes. The supercapacitor specifications are listed in Table II. Each cell of the supercapacitor contains a non-aqueous electrolyte allowing the maximum rated voltage of 2.7 Volts. In this example, six of these cells are connected in series to build a supercapacitor module with a nominal voltage of 16.2V.

As with the battery 202, a first order equivalent circuit model, as depicted in FIG. 4, is parameterized and otherwise generated for the supercapacitor 204. The open circuit voltage, capacity, series resistance, resistance and capacitance of the R-C pairs are the parameters identified. Actual capacity and the OCV are obtained by charging the supercapacitor from zero to its maximum nominal voltage under a low current of 0.225 A. The supercapacitor is then discharged to zero with a similar current rate to obtain the capacity and OCV for discharging. The difference between charging and discharging OCV is small due to low current and small internal resistance. Pulse-relaxation experiments are used to identify the series resistance $R_s$, the resistance $R_1$, and the capacitance $C_1$. The parameter identification may be performed as described above in connection with the battery by minimizing the square error between the measured and simulated terminal voltages at each time instant.

TABLE II

| SUPERCAPACITOR SPECIFICATION | |
| --- | --- |
| Voltage (V) | 2.7 |
| Nominal Capacity (F) | 3000 |
| Specific Power (W/Kg) | 5900 |
| Specific Energy (Wh/Kg) | 6 |

The above-described models may be incorporated into a system model representative of the energy storage system of which the energy storage devices are components. The system model, in turn, may include a representation of the load to which the energy storage system is coupled. One or more of these models may then be used in or by a control procedure implemented by a processor, such as the processor of a microcontroller, to control the charging current provided by, for instance, the battery 202 (FIG. 2). Further details regarding examples of the control procedure are provided below in connection with the examples of FIGS. 5-7. An implementation of one example of the control procedure is described below in connection with a scooter vehicle.

The specifications, parameters, and other characteristics of the energy storage devices of the disclosed systems may vary from the examples described above. For instance, alternative or additional types of batteries may be used for the battery 202 (FIG. 2). Alternative or additional types of supercapacitors may be used for the supercapacitor 204 (FIG. 2). Furthermore, the disclosed systems are not limited to the types of energy storage devices described and/or modeled herein.

Figure 5:
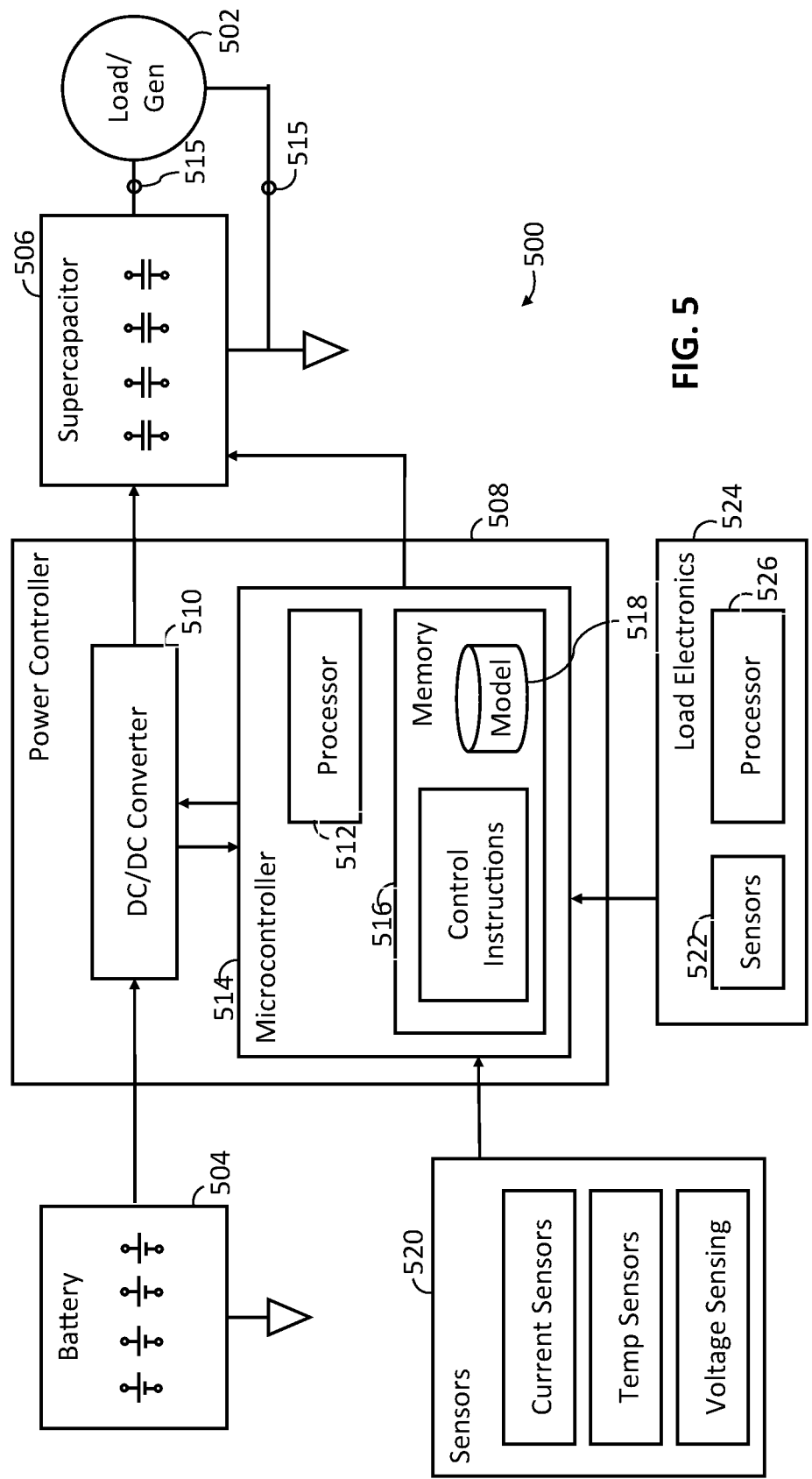
FIG. 5 is a block diagram of an energy storage system having multiple energy storage devices in accordance with one example.

FIG. 5 illustrates a hybrid energy storage and delivery system 500 having the configuration of FIG. 2. The system 500 is used to provide power to a load 502. The load 502 may be or include a brushless DC electric motor, such as those used in vehicle drivetrains. Other types of motors may be powered. In this example, the load 502 is part of a system that includes a generator that returns energy to the system 500. In some cases, the system 500 is deployed on a vehicle that presents the load and generator. The system 500 may be deployed in a wide variety of applications and in connection with various types of loads.

The system 500 includes multiple energy storage devices 504, 506 coupled to one another. In this example, the energy storage devices 504, 506 are coupled actively via a converter as described below. In other cases, some or all of the storage devices of the system 500 may be coupled either actively or passively (e.g., with a diode and/or via direct parallel connection). The energy storage devices 504, 506 may be coupled and arranged in various combinations of parallel and/or series configurations to meet the voltage and current demands of the system 500 and/or the load 502. In this example, the energy storage device 504 is or includes a battery 504, such as a lead-acid battery. The battery 504 may include a number of series-connected cells that collectively form a battery module (e.g., a 12 Volt, 22 Ampere-hour module). The number of cells, configuration, capacitance, and other characteristics of the supercapacitor 506 may vary. For example, the terminal voltage of the battery 504 may differ. The energy storage device 506 is or includes a supercapacitor 506, such as one of the supercapacitors described herein. In one example, the supercapacitor 506 includes a bank of series-connected supercapacitor cells (e.g., six 500 Farad cells) that collectively form an approximately 16-Volt module. The number of cells, configuration, capacitance, and other characteristics of the supercapacitor 506 may vary. For example, fewer or additional cells may be included.

The energy storage devices of the system 500 are arranged such that the supercapacitor 506 is charged via a charging current provided by the battery 504. In some cases, a charging current also flows in the opposite direction. For instance, the battery 504 may be charged by the supercapacitor 506.

Additional and/or alternative types of energy storage devices may be used. For example, one or both of the energy storage devices 504, 506 may include a combination of batteries and capacitors (e.g., supercapacitors). For example, the energy storage device 504 may include multiple batteries coupled in series.

The energy storage devices 504, 506 may differ in energy density and/or power density. In the example of FIG. 5, the battery 504 has an energy density higher than that of the supercapacitor 506, while the supercapacitor 506 has a power density higher than that of the battery 504. The extent to which the energy and power densities differ may vary. In other cases, the energy densities and/or power densities of the energy storage devices 504, 506 may be equal, about equal, or reversed from the example shown.

The differences in the energy storage devices 504, 506 may alternatively or additionally involve the internal resistance and/or charge acceptance rate of the device. In the example of FIG. 5, the supercapacitor 506 has a lower internal resistance and a higher charge acceptance rate than the battery 504. The extent to which the internal resistances and the charge acceptance rates differ may vary. For instance, in other cases, the charge acceptance rate of the supercapacitor 506 may not be higher, but nonetheless the supercapacitor 506 does not suffer degradation or other adverse effects from high charging rates as much as the battery 504.

The system 500 includes a power controller 508 configured to manage charging and power delivery. The power controller 508 includes a converter 510 disposed between the battery 504 and the supercapacitor 506. The converter 510 is configured to control a level of the charging current from the battery 504. To that end, the converter 510 may include a set of switches (e.g., MOSFET and/or other transistor switches) that are selectively activated to control the charging currents drawn from the battery 504 and provided to the supercapacitor 506.

In some cases, the converter 510 is or includes a phase shift modulation (PSM) DC/DC converter. For example, a full bridge PSM DC/DC converter may be used, in which a phase between the bridge columns is introduced to cause an overlap in conduction time between the top and bottom switches. The PSM converter may use a fixed duty cycle (e.g., about 50%). This operation, along the delay in PWM of each column, may lead to (i) the output capacitances of the switches (e.g., MOSFET devices) resonating with the leakage inductance of the transformer and (ii) the oscillation of the MOSFET voltage to zero before the next turn-on period. In so doing, the converter 510 is capable of achieving zero voltage switching (ZVS), which presents almost no turn-on switching loss. A significant improvement in efficiency is achieved, thereby enabling operation at higher frequencies and making it possible to use smaller magnetic components. Other types of DC-to-DC converters may be used, including, for instance, a pulse width modulation (PWM) converter.

In the example of FIG. 5, the converter 510 is disposed between the battery 504 and the load 502. In some cases, the power controller 508 is configured to provide energy and current in a unidirectional manner, i.e., from the battery 504 to charge the supercapacitor 506. In other cases, the power controller 508 is bidirectional such that current can flow back toward the battery 504. In such cases, the supercapacitor 506 may be capable of charging the battery 504.

The power controller 508 includes a processor 512 configured to generate switch control signals to direct the converter 510. The converter 510 is configured to control the level of the charging current in accordance with the switch control signals. In the example of FIG. 5, the processor 512 is part of a microcontroller 514 of the power controller 508. In some cases, the processor 512 and the microcontroller 514 are configured for 32-bit processing. The configuration and other characteristics of the processor 512 and the microcontroller 514 may vary. For example, the processor 512 may be configured to process 16-bit data.

The power controller 508 implements a power management control strategy. The control strategy is directed to managing a number of different operational parameters or characteristics of the system 500 by controlling the charging current provided by the battery 504. In some cases, the control strategy is configured to increase (e.g., maximize) the efficiency of the system 500 given various operational parameters regarding, for instance, the states of the energy storage devices 504, 506, the converter 510, and/or the load 502. Efficient operation of the energy storage devices 504, 506 is thus capable of being achieved. Alternatively or additionally, the control strategy is configured to reduce (e.g., minimize) stress on the battery 504 that may otherwise result from high power demands, such as those presented by electric and hybrid electric vehicle applications. Protecting the health of the battery 504 improves the lifetime of the battery 504. Alternatively or additionally, the control strategy is configured to prevent or otherwise address overvoltage conditions at the supercapacitor 506. The control strategy may be configured to address additional or alternative aspects of the system 500.

In the example of FIG. 5, the control strategy is implemented in connection with a topology of the system 500 in which the supercapacitor 506, but not the battery 504, is connected across the load 502. The load 502 is connected (e.g., electrically tied) to output terminals 515 of the system 500, via which power is provided to the load 502. In this example, the output terminals 515 correspond with the output terminals of the supercapacitor 506. As a result, the terminals of the supercapacitor 506 are electrically tied to the terminals of the load 502. In this topology, the supercapacitor 506 is responsible for supporting operation of the load 502 (e.g., vehicle traction). In some cases, the supercapacitor 506 is also responsible for capturing any generated energy (e.g., energy produced during regenerative braking), which otherwise would be wasted in the form of heat in friction brakes. Thus, for example, the load 502 shown in FIG. 5 may be considered to include (e.g., include via switching a connection to) a vehicle regenerative braking system coupled to the output terminals 515 to store regenerative braking energy in the supercapacitor 506.

In contrast, the battery 504 is electrically spaced from the output terminals 515 of the system 500. As shown in FIG. 5, the converter 510 is disposed between the battery 504 and one of the output terminals 507. The battery 504 may thus be considered to be electrically isolated, or decoupled, from the load 502. Rather than provide power directly to the load 502, the battery 504 instead functions to charge the supercapacitor 506.

The battery 504 may be charged separately and independently from any charging on the load side. For example, the battery 504 may only be charged via a separate charging circuit, e.g., when the system 500 is plugged into a power source (e.g., the electric utility). Alternatively, the battery 504 is charged via current from the load side, such as during discharge of the supercapacitor 506 and/or during power generation (e.g., regenerative braking).

The charging current drawn from the battery 504 is regulated by the power controller 508. The charging current may be regulated in accordance with a set point, thresholds (e.g., limits), and/or other control parameters. The power controller 508 enforces the control parameters via the DC/DC converter 510. For example, the power controller 508 controls the charging current to maintain the supercapacitor terminal voltage within upper and lower limits. The limits may be selected based on various characteristics of, for instance, the supercapacitor 506 and/or the load 502. In one example, the charging current is limited or otherwise regulated to allow storage of regenerative breaking energy into the supercapacitor 506 during hybrid or electric vehicle operation, while maintaining a suitable supply of power for traction motor demand.

The power controller 508 may be configured to establish and maintain the level of the charging current provided by the battery 504 by implementing a control procedure. The microcontroller 514 and/or the power controller 508 includes a memory 516 coupled to the processor 512 on which control instructions are stored. The control instructions may be or include a charging current instruction set. Other instructions or instruction sets may be provided, including, for instance, instructions directed to supercapacitor cell balancing. Execution of the control instructions by the processor 512 causes the processor 512 to generate the switch control signals to be provided to the converter 510 to regulate the charging current and otherwise implement the power management control strategy.

The memory 516 may include one or more computer-readable memories and/or storage devices, such as flash memory. The memory 516 may be integrated with the processor 512 to any desired extent. For example, the processor 512 and the memory 516 may be provided via a single integrated circuit (IC) chip. Some or all of the memory 516 may be external to the processor 512. For example, the microcontroller 514 may include a discrete flash memory IC chip coupled to the processor 512 to augment the onboard memory integrated therewith.

In some cases, the charging current instructions are executed by the processor 512 to cause the processor 512 to regulate the charging current via a model predictive control procedure. The model predictive control procedure is directed to establishing or otherwise determining a set point for the charging current. In the example of FIG. 5, data indicative of the model utilized by the model predictive control procedure is stored in a database 518 or other data store of the memory 516. The model data may be representative of any one or more components or aspects of the system 500, including, for instance, the energy storage devices 504, 506, the converter 510, and the load 502.

The model predictive control procedure may be configured in accordance with one or more respective instances of the models of the energy storage devices described above in connection with FIGS. 3 and 4, e.g., in this example, the battery 504 and the supercapacitor 506. The model may accordingly be based on a plurality of energy storage parameters indicative of the operating conditions of the battery 504 and the supercapacitor 506. The model data is not limited to parameters related to the energy storage device models described above. The model predictive control procedure may thus implement a control strategy cognizant of battery health and/or supercapacitor health.

The model may be representative of a variety of other parameters for the system 500. For example, a plurality of load profile parameters indicative of operation of the load may be incorporated into the model. The model may still further include one or more parameters indicative of an operating condition of the converter 510, such as the operating temperature of the converter 510.

The system 500 includes a number of sensors 520 to capture data to be applied, incorporated into, or otherwise utilized by the model and, thus, the model predictive control procedure. In the example of FIG. 5, the sensors 520 include current sensors, temperature sensors, and voltage sensing elements. The current sensors may be disposed along, for instance, the line carrying the charging current from the battery 504 to the converter 510, as well as the line carrying current from the converter 510 to the supercapacitor 506. Additional or alternative current sensors may be included. For instance, the level of the current between the load 502 and the supercapacitor 506 may be sensed. Other sensors may be disposed within the converter 510. The temperature sensors may be disposed within, at, or in various components of the system 500, including, for instance, the battery 504, the supercapacitor 506, and the converter 510. Voltage sensing elements may be used to access the voltage at a number of nodes of the system 500, including, for instance, the terminals of the battery 504 and the supercapacitor 506, as well as the individual cells of the battery 504 and the supercapacitor 506.

A number of sensors 522 may also be provided to capture or otherwise provide data indicative of, or otherwise related to, the load 502. The sensors 522 may be provided via load electronics 524, which may include a number of components, such as a processor 526, external to the system 500. In vehicular examples, the processor 526 may be, include, or be a component of, a powertrain controller. Examples of the load parameters for which the data may be representative include vehicle velocity, vehicle weight, distance to next intersection, driver command acceleration, and/or, driver command braking. The load 502 may be modeled using any combination of these and/or other load parameters. The model of the load 502 may be incorporated into, or otherwise integrated with, the system model.

Use of the sensor and other data indicative of the load, storage device, and other model parameters may help the model predictive control procedure to determine a desired (e.g., optimal) charging current level. In one example, the sensor data is applied to a lookup table, decision tree, or other data structure indicative of the model that provides the desired level as an output. The desired level may, in turn, be used as a set point or other control parameter to yield greater energy efficient operation over a finite time horizon into the future. The charging current may be further constrained by one or more other aspects of the control procedure, including, for instance, a maximum and a minimum safe operating voltage for an energy storage device or individual cell thereof.

One or more aspects of the sensor and other data indicative of the system 500 may also be used to update the model itself. In such cases, sensor data is used to adjust the lookup table, decision tree, or other model data in the data store 518. For example, data indicative of the vehicle weight may be used to modify a decision tree of the model. The model may also be updated to take into account the aging of one or more of the energy storage devices. Various parameters may be used, including, for instance, the internal resistance of the battery and/or supercapacitor (e.g., as characterized by the Parameter $R_s$ in the equivalent circuit equation (1), the storage capacity $C_{nom}$ of the capacitor, the storage capacity of the battery, or any of the other R-C pairs in the equivalent circuit model). Alternatively or additionally, the model may be updated via sensed temperatures of the supercapacitor and/or battery cells and estimates for the state of charge and depth of discharge.

In some examples involving full bridge PSM and other converters, the power controller 508 may be configured via the charging current instructions to control the converter 510 using two single input/single output (SISO) control loops. The first loop is directed to managing the switch currents per PWM cycle. The second loop is directed to regulating the battery input current with respect to the set point. Alternative, fewer, or additional control loops may be implemented in other cases.

The charging current control loop(s) may be implemented in conjunction other control procedures. For instance, the charging current control loop(s) may be overridden or otherwise affected by procedures directed to cell balancing, over-current protection, over-voltage protection, and/or over-temperature protection.

In some cases, the charging current and/or other control instructions are executed by the processor 512 to cause the processor 512 to generate the switch control signals such that a terminal voltage of the supercapacitor 506 is regulated. The terminal voltage regulation may be in addition to, or an alternative to, the above-described charging current control. In some cases, however, the charging current instructions are executed by the processor 512 to cause the processor 512 to regulate the charging current via a hysteretic control procedure directed to maintaining the terminal voltage of the supercapacitor 506 within a voltage range. The voltage range may be defined by a pair of voltage thresholds. In other examples, the power controller 508 determines a voltage set point for the supercapacitor 506. The voltage set point may be generated using another model predictive control procedure.

In some cases, the voltage regulation is implemented on a cell-by-cell basis. The charging current instructions may thus cause the processor 512 to generate the switch control signals such that respective cell voltages of the plurality of cells are individually regulated. In this way, the charging current is controlled to address the individual cell voltages. As a result, in some cases, the voltage regulation is configured to prevent overcharge of any respective cell in the series-connected supercapacitor string.

The charging current and/or other control instructions may also cause the processor 512 to implement cell balancing across the cells of the supercapacitor 506. Cell balancing may be used to address any imbalance in individual supercapacitor cell voltages that might arise due to differences in self-discharge rates. To that and other ends, the microcontroller 514, the processor 512, and/or the power controller 508 may provide control signals to one or more switches disposed within or coupled to the supercapacitor 506. The control signals may be directed to draining or otherwise balancing the accumulated charge of one or more supercapacitor cells.

The control procedure implemented by the microcontroller 514 may differ from the examples described above to accommodate the configuration of the supercapacitor 506 or other element of the energy storage device disposed on the load side. For instance, in an example in which the supercapacitor 506 is configured such that each supercapacitor cell is charged by a respective cell current, the charging current instructions may cause the processor 512 to generate the switch control signals to regulate the respective cell currents individually. For example, a hysteretic control procedure may be implemented for each cell. Such cell-by-cell control may be used to avoid, minimize, or otherwise reduce energy wasted via cell balancing. In such cases, the system 500 may be configured to provide an indication of the cell voltage level for each respective cell to the power controller 508. The converter 510 may then be configured to generate a respective cell charging current for each cell based on the cell voltage level.

The above-described control procedures may be implemented in connection with a topology having only the single DC-to-DC converter 510 directed to regulating the current drawn from the battery 504. The control procedures may, but need not, be configured to keep the current constant (e.g., via set point control). As described above, the converter 510 may, but need not, be unidirectional. In cases involving a bidirectional converter(s), the power controller 508 may generate additional switch control signals. Bidirectional converters may be useful in configurations in which the supercapacitor 506 is additionally used to charge the battery 504 to capture additional energy (e.g., from braking) beyond that which the supercapacitor 506 is capable of storing.

In some cases, the load electronics 524 are accessed by the processor 512 to obtain model or other data. For instance, the load electronics 524 may include a memory and/or other data storage device in which a data log, lookup table, or other data structure is stored. Alternatively or additionally, the load electronics 524 may be accessed to obtain data indicative of parameters regarding the load 502. In these and other cases, the system 500 may include one or more components of the load electronics 524. The processor 526 and any other components of the load electronics 524 (e.g., a memory) may accordingly be considered to a part of the processor 512 or other corresponding component of the microcontroller 514.

Figure 6:
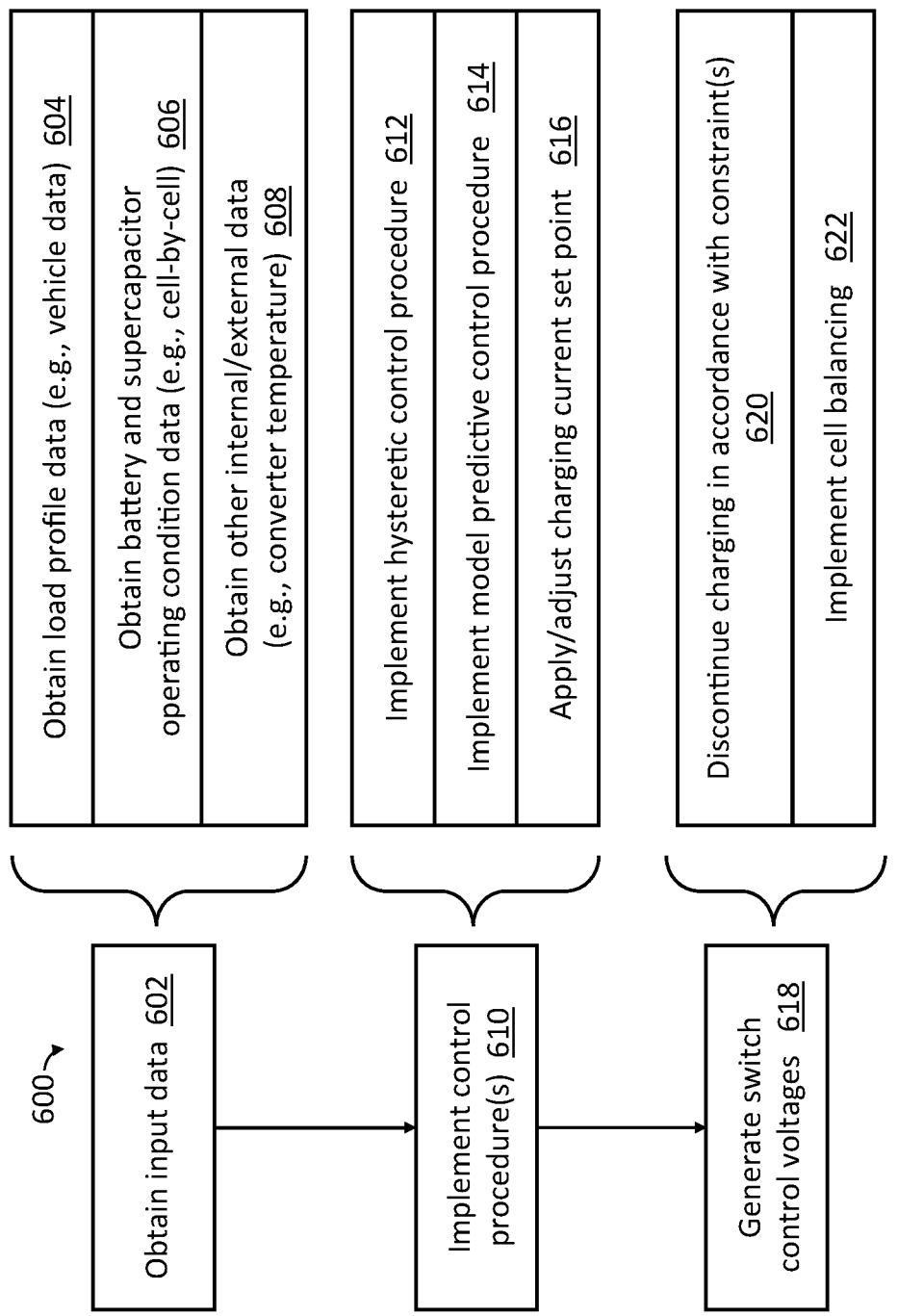
FIG. 6 is a flow diagram of a method of controlling an energy storage system in accordance with one example.

FIG. 6 depicts a method 600 of controlling an energy storage system, such as the system 500 of FIG. 5. The method 600 may be implemented by the processor 512 (FIG. 5) during operation of the system 500. For example, the processor 512 is configured via execution of the control instructions stored in the memory 516 (FIG. 5) to cause the processor 512 to implement the method 600. The method 600 may be implemented in additional and/or alternative ways. For instance, the method 600 may be implemented by a remote processor, such as a processor in communication with the processor 512 and/or the processor 526 (FIG. 5) of the load electronics 524 (FIG. 5).

The method 600 includes an act 602 in which data representative of a plurality of energy storage system parameters is obtained. The nature of the parameters may vary. In some cases, the act 602 includes an act 604 in which load profile data is obtained. The load profile data is indicative of the operation or other characteristics of the load. As described above, in vehicular examples, the load profile data may be indicative of parameters such as vehicle weight, speed, vehicle driver command acceleration, etc.

Alternatively or additionally, the act 602 includes an act 606 in which data indicative of the operating conditions of a battery or of a supercapacitor of the system is obtained. One of the operating conditions is a level of a charging current from the battery for charging the supercapacitor. The parameters may also be indicative of other operating conditions, such as terminal voltage levels, operating temperatures, and other current levels.

Data for any number of other parameters may be obtained in an act 608. In the example of FIG. 6, the act 608 involves obtaining data indicative of various internal and/or external parameters. The internal parameters relate to components of the energy storage system. For example, data indicative of the operating temperature of a converter may be obtained. The external parameters relate to aspects external to the energy storage system that nonetheless may affect the operation of the system and/or the load. In one example, data indicative of the ambient temperature is obtained.

The manner in which the data indicative of the parameters is obtained may vary with the nature of the data. In some cases, a sensor (e.g., a current sensor) is disposed within the system to capture the data (e.g., a voltage or current level). In other cases, a memory may be accessed to obtain the data. In still other cases, the data may be obtained via receipt of a message or other data transmission sent to the system.

In act 610, a processor implements one or more control procedures to generate a set point for the charging current. The control procedure taking the data obtained in the acts 602-608 as input data. The processor may be or include a processor of a power controller of the system, as described above.

In the example of FIG. 6, the act 610 includes implementing a hysteretic control procedure in act 612, implementing a model predictive control procedure in act 614, and applying a set point for the charging current in act 616. The control procedures may utilize different parameter data. For instance, the hysteretic control procedure may determine whether a terminal voltage and/or an operating temperature falls within or outside a range (e.g., exceeds a threshold). If so, the hysteretic control procedure may discontinue the charging current. The charging current may remain off until the parameter passes another threshold or returns to a desired range. The hysteretic control procedure may override the control signals generated by another control procedure, such as the model predictive control procedure of the act 614. In some cases, the hysteretic control procedure is applied to constrain the voltage of each cell of the supercapacitor. Alternatively or additionally, the overall terminal voltage of the supercapacitor is constrained.

In the example of FIG. 6, the model predictive control procedure is implemented to generate a set point for the charging current. The set point is determined in accordance with a model of the energy storage system and/or the load. Data indicative of the model may be accessed or otherwise obtained before or during the act 614. In these cases, the set point is based on the input data obtained in the act 602. For example, the input data may be applied to a lookup table or decision tree, used to calculate further parameters, and/or otherwise applied to the model.

The charging current set point may be applied in an act 616. Application of the set point may include implementing one or more control loops. The control loop(s) may involve the processing of feedback data from the power converter and/or other components of the system. In the example of FIG. 6, the act 616 also includes adjusting the set point in accordance with the output of the model predictive control procedure. Other adjustments may also be made. For instance, the data indicative of the model may be adjusted in accordance with, for instance, the input data obtained in the act 602.

Switch control signals for a converter of the power controller are generated in act 618. The switch control signals being generated in accordance of the set point. The converter may include a set of transistors responsive to the switch control signals. As described above, the converter is disposed between the energy storage devices (e.g., the battery and the supercapacitor) to receive the charging current.

The act 618 may include discontinuing charging in certain circumstances in an act 620, such as when one of the control procedures indicates an over-voltage or over-temperature condition. Any number of additional overrides of the set point-based control strategy may be implemented.

The act 618 may also include an act 622, in which cell balancing is implemented for one of the energy storage devices, such as the supercapacitor. In some cases, the cell balancing is implemented via separate control signaling (e.g., switch control signaling) directed to switches within the storage device. Alternatively or additionally, the cell balancing is achieved via switching within the converter. For example, switching in the converter may address cell balancing when the charging current is or includes a combination of individual, constituent charging currents for each respective cell of the supercapacitor.

Figure 7:
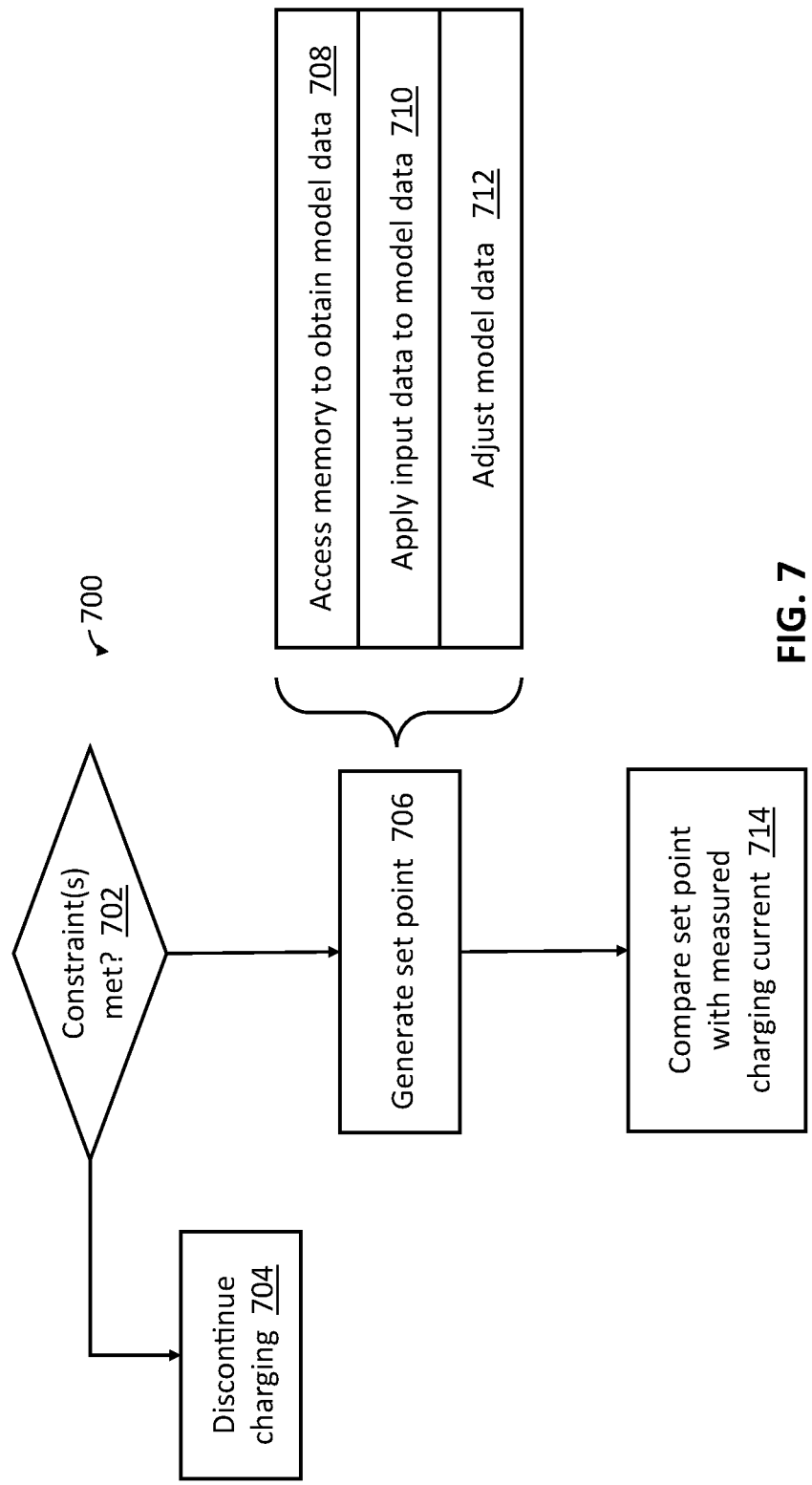
FIG. 7 is a flow diagram of a control procedure of the method of FIG. 6 in accordance with one example.

FIG. 7 depicts a method 700 in accordance with one example in which a model predictive control procedure is implemented. The method 700 may be implemented as part of the method 600 of FIG. 6 or another method. The method 700 may begin with a decision block 702 to determine whether one or more constraints are met. If the constraints are not met, control passes to a block 704 in which charging is discontinued. The constraints may be part of another control procedure (e.g., a hysteretic control procedure). The constraint(s) may involve cell voltages, terminal voltages, and/or other parameters of the energy storage system. If the constraints are met, control passes to a block 706 directed to generating a set point for the charging current. In this example, the set point generation includes accessing a memory in which model data is stored (act 708), applying input data indicative of the system and/or load to the model (act 710), and, at least in some cases, adjusting the model data in accordance with the input data (act 712). The model (whether adjusted or not) may then be used to generate the set point. The control procedure may then continue in an act 714 in which the generated set point is compared with the measured level of the charging current.

Example—Scooter Vehicle

The hybrid energy storage and delivery system disclosed herein (e.g., the system 500 of FIG. 5) were tested in an example electric scooter application, where the scooter had the parameters listed in Table III. These parameters and this testing is presented herein merely by way of example. Other types of vehicles or loads may be used to examine the efficiency, performance, and other aspects of the control techniques of the disclosed methods and systems. The scooter had a 48 volt powertrain. The hybrid energy controller used a 12 Volt setup, which meant that the power extracted from the scooter, using a simulated New York city driving cycle, was scaled down by a factor of 4.

Load current was drawn from the supercapacitor using a dynamic battery cycler model FTV1 from Bitrode Corporation, St. Louis, Mo. The cycler was programmed to emulate the motor current of an electric scooter. The load was simulated using a vehicle driving cycle, in particular the New York city driving cycle, which includes frequent stop and go sequences. The driving cycle was 1.18 miles in length and stacked back-to-back to construct the load profile for range studies.

TABLE III

SCOOTER SPECIFICATIONS

| Vehicle + Passenger Mass (Kg) | 108 + 70 |
| Drag Coefficient | 0.75 |
| Frontal Area (m$^2$) | 0.6 |
| Rolling Resistance | 0.0007 |
| Air Density (Kg/m$^3$) | 1.125 |
| Wheel Radius (m) | 0.21 |

The simulation included testing for a stand-alone battery to evaluate the range of the battery-driven powertrain. The amount of regeneration during braking was considered to be zero. This was due to the high internal resistance of lead-acid batteries, which leads to thermal and physical stresses resulting in a lower life span for the battery. The maximum allowable charging current for the module used in this example was 6.6 Amperes (A), which was much smaller than the peak regeneration current of 75 A. The range and the root mean square error (RMSE) results for the stand-alone battery are shown is Table IV. The simulation was stopped and the range calculated at the point where the SOC of the battery reached 65%. This is because of the 35% percent depth of discharge (DOD) recommended in the literature and considered in the parameterization and modeling of the module.

TABLE IV

RESULTS FOR THE STAND-ALONE BATTERY

| Range in Miles (Km) | RMSE (mV) |
|---|---|
| 11.19 (18) | 41 |

By contrast, in the hybrid configuration of the present techniques, the supercapacitor was responsible for providing the total amount of the requested load. In this case, regeneration from braking power was feasible as the supercapacitor was capable of being charged at high rates due to its low internal resistance. Simulation results were compared to three experimental measurements at 0, 10 and 20% regeneration rates. According to the power management strategies described above, the battery provided a constant current of 5.5 A at all times unless the SOC of the supercapacitor became equal to one. This is determined from the battery current profile. The supercapacitor bank SOC varied between 100% and 94%. This narrow and high range of operation was where the supercapacitor operated more efficiently. Another feature of this power management strategy is that operating in a small range of voltage avoided the drawback where usually there is a large operating voltage window not favorable for the inverter efficiency between the supercapacitor and the electric motor. The values for the range at 0% regeneration for the hybrid setup and the RMS errors for the terminal voltages of the battery and the supercapacitor are summarized in Table V.

TABLE V

RANGE AND RMSE RESULTS FOR THE HYBRID SETUP WITH 0% RENEGERATION

| Range in Miles (Km) | 9.9 (15.93) |
|---|---|
| RMSE Battery (mV) | 27 |
| RMSE Supercapacitor (mV) | 37 |

The range of the hybrid battery-supercapacitor in the case of 0% regeneration was 11.5% less than the stand-alone battery case. The reason is the DC/DC converter efficiency, which reduced the total efficiency of the powertrain. Connecting the supercapacitor with the lower internal resistance to the load and relaxing the battery by allowing it to only provide a constant amount of current cannot compensate for the losses of the converter. The efficiency of the converter during the experiment for the 0% regeneration case had an average of 86% when the converter is in operation.

In order to compensate for the losses of the converter, the configuration of the hybrid setup was utilized in experiments run at 10 and 20% regeneration. Table VI summarizes the range results for the 10 and 20% regeneration tests.

The results show that a regeneration rate of 20% results in an improvement in the total range by 10%. Higher amounts of regeneration result in even better range. The available amount of regeneration in heavier vehicle platforms is higher and such a design may result in even better range extension in such applications.

TABLE VI

RANGE OF HYBRID ENERGY SYSTEM USING
DIFFERENT REGENERATION RATES

| Regeneration (%) | Range in Miles (Km) |
|---|---|
| 0 | 9.9 (15.93) |
| 10 | 10.7 (17.22) |
| 20 | 12.4 (19.96) |

The example testing and foregoing description show that hybridizing a battery using supercapacitors can substantially increase the range of a vehicle or other energy load system.

In one aspect, systems and methods are described for a battery-supercapacitor hybrid that includes a unidirectional power converter to provide higher power capability and range extension by lowering peak battery currents. In accordance with an example, an energy storage system includes a storage supply element including one or more batteries formed of battery cells; a rechargeable supply element including one or more supercapacitors, and a power controller coupled to the storage supply element in a unidirectional manner and configured to receive energy from the storage supply element, the power controller being further configured to convert the received voltage or current into a charging current or cell balancing current and configured to provide the charging current or cell balancing current to the rechargeable supply element. The rechargeable power supply element is configured to provide energy or power to a load coupled to the energy storage system. One or both of the rechargeable power supply element and power controller is configured to protect the one or more supercapacitors of the rechargeable supply element from over voltage, under voltage and/or over temperature conditions.

In connection with any one of the aforementioned aspects (including, for instance, those set forth above in the Summary of the Disclosure), the systems or methods may alternatively or additionally include any combination of one or more of the following aspects or features. The supercapacitors are asymmetric supercapacitors. The asymmetric supercapacitors include vanadium nitride (VN), an early transition nitride, a carbide, a boride, or a combination thereof, forming an electrode of the asymmetric supercapacitor. The power controller includes one or more direct-current-to-direct-current (DC/DC) converters. The DC/DC converters are configured to receive, unidirectionally, current for charging the one or more supercapacitors of the rechargeable supply element in response to a control signal and configured to charge the one or more supercapacitors in order to regulate a terminal voltage of the rechargeable supply element. A vehicle regenerative braking control system interface is coupled to the rechargeable supply element to provide energy from the vehicle regenerative braking control system for storage of that energy in the rechargeable supply element during a storage mode. A traction motor control system interface is coupled to the rechargeable supply element to receive energy from the rechargeable supply element during a delivery mode. The power controller implements a hysteresis control procedure to maintain a terminal voltage of the rechargeable supply element between two voltage or energy thresholds. The rechargeable supply element is directly connected to a load. The power controller implements a model predictive control procedure that provides a voltage set point at each time instant, for the terminal voltage of the rechargeable supply element, or a set point for a charging current for the rechargeable supply element. The model predictive control algorithm uses vehicle velocity, weight, distance to next intersection, driver command acceleration, and/or driver command braking, to determine a desired (e.g., optimal) voltage or current level. The voltage level yields greater energy efficient operation over a finite time horizon into the future. The voltage level is constrained by a maximum and a minimum safe operating voltage for the energy storage system.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A system comprising:
a first energy storage device;
a second energy storage device coupled to the first energy storage device and charged via a charging current from the first energy storage device;
a power controller comprising a processor, a memory coupled to the processor and on which charging current instructions are stored, and a converter coupled to the processor and directed via switch control signals from the processor; and
an output terminal via which power is provided to a load of the system, wherein the converter is disposed between the first energy storage device and the output terminal;
wherein the converter is disposed between the first and second energy storage devices and configured to control a level of the charging current in accordance with the switch control signals,
wherein the charging current instructions are executed by the processor to cause the processor to generate the switch control signals such that the level of the charging current is regulated, and
wherein the second energy storage device is configured to provide higher power than the first energy storage device.

2. The system of claim 1, wherein a terminal of the second energy storage device is electrically tied to the output terminal.

3. The system of claim 1, wherein the charging current instructions are executed by the processor to cause the processor to generate the switch control signals such that a terminal voltage of the second energy storage device is regulated.

4. The system of claim 1, wherein:
the second energy storage device comprises a plurality of supercapacitor cells; and
the charging current instructions are executed by the processor to cause the processor to implement cell balancing across the plurality of supercapacitor cells.

5. The system of claim 4, wherein:
each supercapacitor cell of the plurality of supercapacitor cells is charged by a respective cell current;
the charging current corresponds with a sum of the respective cell currents for the plurality of supercapacitor cells; and
the charging current instructions are executed by the processor to cause the processor to generate the switch control signals to regulate the respective cell currents to control a respective cell voltage of each supercapacitor cell of the plurality of supercapacitor cells relative to a threshold cell voltage.

6. The system of claim 1, wherein the charging current instructions are executed by the processor to cause the processor to regulate the charging current via a hysteretic control procedure directed to maintaining a terminal voltage of the second energy storage device within a voltage range.

7. The system of claim 1, wherein the charging current instructions are executed by the processor to cause the processor to regulate the charging current via a model predictive control procedure directed to establishing a current set point for the charging current.

8. The system of claim 7, wherein the model predictive control procedure is configured to determine the set point for the charging current based on a plurality of load profile parameters indicative of operation of the load.

9. The system of claim 8, wherein the plurality of load profile parameters comprise vehicle distance to next intersection.

10. The system of claim 7, wherein the model predictive control procedure is configured to determine the set point for the charging current based on a plurality of energy storage parameters indicative of operating conditions of the first and second energy storage devices.

11. The system of claim 7, wherein the model predictive control procedure is configured to determine the set point for the charging current based on an operating condition of the converter.

12. The system of claim 1, wherein the second energy storage device comprises a vanadium nitride-based electrode.

13. The system of claim 1, wherein the converter is configured as a unidirectional DC/DC converter.

14. The system of claim 1, wherein the converter is configured to implement phase shift modulation.

15. The system of claim 1, further comprising a vehicle regenerative braking system coupled to the output terminal to store regenerative braking energy in the second energy storage device.

16. The system of claim 1, wherein:
the first and second energy storage devices have first and second power densities and first and second energy densities, respectively;
the first energy density is higher than the second energy density; and
the second power density is higher than the first power density.

17. A system comprising:
a battery;
a supercapacitor coupled to the battery, charged via a charging current from the battery, and comprising a plurality of cells;
a power controller comprising a processor;
a memory coupled to the processor and on which charging current instructions are stored;
a converter coupled to the processor and directed via switch control signals from the processor; and
an output terminal via which power is provided to a load of the system, the output terminal being electrically tied to a terminal of the supercapacitor;
wherein the converter is disposed between the battery and the supercapacitor and configured to control a level of the charging current in accordance with the switch control signals, and
wherein the charging current instructions are executed by the processor to cause the processor to generate the switch control signals such that a voltage at the terminal of the supercapacitor is regulated and overcharge protection of each cell of the plurality of cells is provided.

18. A method of controlling an energy storage system, the method comprising:
obtaining data representative of a plurality of energy storage system parameters, the plurality of energy storage system parameters being indicative of operating conditions of a battery or of a supercapacitor, the operating conditions including a level of a charging current from the battery for charging the supercapacitor;
implementing, with a processor, a control procedure to generate a set point for the charging current, the control procedure taking the obtained data representative of the plurality of energy storage system parameters as input data; and
generating, with the processor, switch control signals for a converter of the energy storage system disposed between the battery and the supercapacitor to receive the charging current, the switch control signals being generated in accordance with the set point.

19. The method of claim 18, wherein implementing the control procedure comprises determining whether a respective energy storage system parameter of the plurality of energy storage system parameters exceeds a threshold.

20. The method of claim 18, wherein generating the switch control signals includes discontinuing the charging current if the respective energy storage system parameter exceeds the threshold.

* * * * *